Patented Apr. 1, 1930

1,752,531

UNITED STATES PATENT OFFICE

FRANK SIGFRID MALM, OF CHICAGO, ILLINOIS, ASSIGNOR TO WESTERN ELECTRIC COMPANY, INCORPORATED, OF NEW YORK, N. Y., A CORPORATION OF NEW YORK

COMPOSITION OF MATTER AND METHOD OF ITS PREPARATION

No Drawing.   Application filed December 20, 1928. Serial No. 327,487.

This invention relates to compositions of matter and methods of their preparation, and more particularly to compositions used in electrical industries for their insulating and other electrical properties.

The invention further relates to a product of rubber or similar hydrocarbon substances having stabilized electrical characteristics, and to methods of producing such a product.

The objects of the invention are to provide a rubber or similar hydrocarbon product having in a high degree the characteristics desirable in insulating materials, especially for use under water; to provide a rubber product having low water-absorption characteristics; and to provide a rubber product which may be used as an ingredient in insulating materials for submarine cables, particularly in cables employed for speech or other relatively high frequency transmission.

In accordance with the invention, rubber or similar hydrocarbon substance, either in the form of a dispersion in aqueous liquid or in a solid condition, is subjected to the action of a sodium chloride solution at a moderately high temperature, and the resulting product is washed in the solid form. The treatment, when applied to rubber latex, causes a coagulation of the dispersed rubber without the necessity for using the usual coagulants, and appears to cause a physical modification of the rubber and the conversion of part of the protein into water-soluble cleavage products which contain considerable quantities of nitrogen and which are subsequently removed by washing. Rubber treated in accordance with this invention may be made to retain its insulating and electrical properties practically unimpaired for long periods of time when immersed in a salt solution similar to sea water.

The invention and its relation to the prior art will be understood from the following description.

Gutta-percha and balata or mixtures of the two are the only materials which have been generally accepted as suitable for the insulation of submarine cables with high transmission qualities. Various substitutes for these materials have been proposed, including vulcanized rubber, as disclosed in the application of R. R. Williams and A. R. Kemp, Serial No. 678,509, filed December 4, 1923. The disadvantage of the vulcanized rubber insulation formed in accordance with the above application is that it, like all rubber insulations, must be vulcanized in position on the conductor and the cable core is very likely to become deformed during the process of vulcanization, unless expensive and troublesome precautions are taken. Also, vulcanizable rubber alone is too resilient for easy application to a conductor by means of an extrusion machine, which fact necessitates the inclusion in it of some solid, finely divided filler, which has the undesirable effect of raising the dielectric constant of the finished insulation.

Certain thermo-plastic conversion products of rubber have been proposed as ingredients of a compound for submarine insulation. Such conversion products are described in Patent No. 1,605,180 of November 2, 1926 to H. L. Fisher, and according to that patent are obtained by treating rubber with sulphuric acid or an aromatic derivative of sulphuric acid. Although the conversion products themselves have not the essential mechanical properties of gutta-percha, submarine insulating compounds of apparently satisfactory electrical and mechanical properties may be produced by mixing the conversion products with ordinary crude rubber, gutta percha, or balata. However, the production of the conversion products is a relatively elaborate and expensive operation in view of the necessity of an extremely careful control of the reactions and a high degree of skill in the process of removing the by-products of the reaction.

It has also been proposed to use raw rubber in admixture with vegetable waxes as a submarine insulating compound. Such a compound is described in United States Patent No. 699,383, dated May 6, 1902, to Adolf Gentsch, and it has been found that such compounds may possess fairly satisfactory mechanical properties. However, they are not electrically stable, and it is for this reason that they have not been adopted for use in insulating submarine cables.

In experiments with rubber for use in submarine insulating compounds it has been found that in the unmixed, unvulcanized state, thoroughly washed, crude rubber is not electrically stable when immersed in water, since during such immersion it undergoes a gradual increase of dielectric constant and decrease of insulation resistance up to a certain point, when sudden and almost complete failure of the material with respect to insulating properties occurs. It appears that this sudden failure of crude rubber in water is due to protein films which pervade the mass, forming, when thoroughly wet, paths of low electrical resistance throughout the rubber. It is therefore desirable when unvulcanized rubber is to form an ingredient of a submarine insulation that this tendency to sudden degradation should first be eliminated from the raw materials, and this result can be accomplished by eliminating or materially reducing the protein content of the rubber.

The protein films are likewise thought to have a deleterious effect on the mechanical properties of rubber, in that they form planes of cleavage which impair its toughness, and in that they permit the penetration of water, which accelerates the oxidation and decomposition of the rubber.

A process for removing proteins from rubber is disclosed in the application of A. R. Kemp, Serial No. 215,235, filed August 24, 1927, wherein the rubber is subjected to the action of water at a temperature above 100° C. for several hours to render the proteins soluble, and is then washed to remove the proteins. The method disclosed in the present application is designed as an improvement on that of the Kemp application above identified.

According to the present invention, the rubber either in the form of crude rubber or uncoagulated latex is mixed with a solution of sodium chloride in such proportions as to provide for considerable dispersion of the rubber content, and the resulting mixture is subjected to a temperature of from 130° C. to 240° C. for a period of time ranging from thirty hours to one hour, depending upon the temperature applied. The effect of the sodium chloride in the process is to promote decomposition of the proteins contained in the rubber into soluble cleavage products and to render insoluble in water the proteins which are not decomposed. It seems probable that of the various proteins naturally occurring in rubber some are hydrolyzed by the process to amino acids, others may be partially hydrolyzed to peptones and other intermediate soluble products, while still others may be coagulated and thereby rendered insoluble and less water-absorbent. Some of the resins naturally occurring in the rubber may likewise be broken down into soluble substances. A further effect of the treatment, when applied to latex, is to coagulate it, thereby making it unnecessary to employ acetic acid or other coagulants. The rubber may then be removed from the liquid and washed in the usual manner, but it will generally be found advantageous before washing to add a softener such as petrolatum, pine tar, or palm oil in order to facilitate the removal of the sodium chloride solution, traces of which, if left in the product, deleteriously affect the electrical characteristics. Where the rubber is to be mixed with balata or similar substance, as described below, the balata may be added to the rubber before washing to soften it, in which case no other softener need be used.

In practicing one embodiment of the invention, rubber latex was diluted with four parts of a 1% sodium chloride solution to one part of latex, and the mixture was then placed in a vulcanizer and subjected to a steam pressure of 50 pounds per square inch for 9 hours. After the heat treatment the excess liquid was removed from the rubber, an amount of deresinated balata equal to the rubber content was added, and the mixture washed for two hours in boiling water on a rubber washer and then dried. Samples of this latter product were immersed in a 3.5% sodium chloride solution and test data taken at intervals over a period of 284 days, at the end of which period the electrical properties of the mixture had stabilized at the following values: capacity in microfarads, 221; dielectric constant, 2.61; conductance in micromhos 18.

The test samples were in the form of sheets .05" in thickness. They were removed from the salt solution for testing, dried in a uniform manner and placed between circular electrodes 5" in diameter and tested with an alternating current of a frequency of 900 cycles per second at room temperature and at atmospheric pressure.

The value of the dielectric constant of 2.61 for the rubber heat treated either as latex or in solid form, measured at room temperature and atmospheric pressure, compares very favorably with the dielectric constant of gutta percha, which in good commercial grades is seldom below 3.0.

It should be noted that if the rubber during the heat treatment be subjected to excessive temperatures, such as those corresponding to a steam pressure of 200 pounds per square inch, or to a lower temperature for an excessive length of time, some depolymerization takes place, and the rubber tends to become soft and tacky and therefore unsuited for cable insulation. The time limit at any particular temperature, for any specific requirements and for any specific type of rubber, at variance with the instances already described, must be experimentally determined. However, the specific procedures described above are typical of those which produce materials of satisfactory mechanical and electrical properties.

Rubber proteins contain a fairly constant percentage of nitrogen, hence the protein content of rubber may be approximately determined from its nitrogen content. It has been determined for Hevea rubber that a reduction in the nitrogen content to one-half of that in the corresponding commercial crude rubber results in such stabilized electrical characteristics as will make a satisfactory product for use as a compounding material for submarine cable insulation. It may be found that for such use a smaller reduction will suffice, or that for use in moist air or under other less extreme conditions a still smaller reduction will be sufficient to stabilize the electrical properties of the product.

The product derived from the method above described is not mechanically adapted to be used alone as a cable insulation, being too resilient to permit proper extrusion to accurate dimensions, and liable to deformation at ordinary temperatures. Suitable compounds for submarine insulation may be obtained by mixing this product with hard waxes, balata and/or other similar substances which melt or soften at moderate temperatures, and which impart the property of thermo-plasticity to the rubber, the added substances themselves possessing suitable electrical characteristics and a suitable resistance to the penetration of water. The method of adding such substances to form a cable insulation is more fully described in the applications of Charles Martell, Serial Nos. 308,610 and 308,611, filed September 27, 1928.

Compositions may thus be obtained which are, in respect both to electrical and mechanical properties, superior to gutta percha as a cable insulation, and at the present market prices considerably cheaper than gutta percha. Tackiness may be completely avoided and the electrical properties perfectly stabilized, and the compositions will be found to possess characteristics which adapt them to the most stringent requirements for submarine cables. Such compositions are superior in electrical characteristics to any materials previously used for the purpose and, in conjunction with the development of modern loading materials, make possible long cables of reasonable dimensions, suitable for the transmission of speech frequencies, which heretofore have been regarded as commercially unattainable.

The following composition has been found to answer these requirements. With the product resulting from the heat treatment of rubber latex, as described above, an insulating compounds has been prepared by mixing with 35 pounds thereof, 35 pounds of deresinated commercial balata, and 30 pounds of refined Montan wax. Samples of this composition, prepared and tested in accordance with the specifications already given herein, have a dielectric constant of about 2.7 and a phase difference angle of about .007 radians, after several months immersion at ordinary temperatures and atmospheric pressure.

Of importance in connection with the use of such compositions for submarine insulation are the low dielectric losses in these compositions at speech or carrier frequencies. The smaller the power factor and, therefore, the phase difference angle, the lower will be the dielectric losses. The values given above relate to measurements taken at room temperature and at atmospheric pressure; they do not change appreciably when the compositions are subjected to the low temperatures and high pressures existing at the sea bottom. Gutta percha insulated cable cores do not change appreciably in capacity with increased pressure but their conductance increases under those circumstances to values about three times larger. At deep-sea conditions of temperature and pressure the gutta percha insulated core of the above dimensions has a conductance of about 50 micromhes per nautical mile.

The treatment proposed in accordance with this invention has been applied to rubber both in the state of commercial crude rubber and of uncoagulated latex. It may be applied to the various species of rubber and to other gums, such as balata and gutta percha, in which it may be desirable to reduce the nitrogen or protein content.

The rubber treated in accordance with this invention is not isomerized or chemically altered in structure but remains a true rubber, with the appearance and mechanical properties of ordinary crude rubber but somewhat improved as to toughness. It has no other chemical constituents than those of crude rubber.

Although this invention has been described from the point of view of submarine cable insulation, it is obvious that it has a more general application to insulating materials which may be subjected to the influence of humidity or water, for example, ordinary rubber-covered wire, and shore ends of submarine cables. The rubber product resulting from this heat treating process is readily vulcanized and may in that form find a broad application wherever the influence of water is to be resisted, as in rubber shoes, gas masks, and similar articles.

What is claimed is:

1. A process of treating a material containing hydrocarbon and a naturally occurring nitrogenous substance which comprises subjecting said material to the action of a sodium chloride solution at a temperature above 100° C. to decompose said nitrogenous substance.

2. A process of treating a material containing rubber hydrocarbon and a naturally occurring nitrogenous substance which comprises subjecting said material to the action of a sodium chloride solution at a steam pressure of 50 pounds per square inch for not more than 24 hours.

3. A method of treating rubber in its natural state and containing a naturally occurring nitrogenous substance, comprising subjecting said substance, while contained in the rubber, to the decomposing action of a sodium chloride solution at a temperature of more than 100° C. for not more than 30 hours.

4. A process of treating rubber containing a naturally occurring water absorbent substance which is insoluble in water, comprising rendering said substance soluble in water by subjecting it to the simultaneous action of heat and of a sodium chloride solution.

5. A process of treating rubber latex containing a naturally occurring highly water absorbent substance which is insoluble in water, comprising rendering said substance soluble in water by adding four parts of a 1% sodium chloride solution to one part of rubber latex and heating the rubber latex in the solution to a temperature of approximately 150° C. for about 9 hours.

6. A method of treating rubber containing hydrocarbon and another substance which is insoluble in water and which is highly water absorbent, which comprises rendering said other substance soluble in water by subjecting the rubber to a temperature of more than 100° C., in the presence of a sodium chloride solution, and washing the resulting product to remove a substantial portion of the substance rendered soluble.

7. A method of treating rubber comprising heating the rubber in a sodium chloride solution in the absence of vulcanizing agents to more than 100° C. and washing the heat treated rubber.

8. A method of reducing the nitrogen content of a material containing rubber hydrocarbon intermixed with a naturally occurring nitrogenous substance for the purpose of improving the electrical properties of said material when used as an insulator under water, characterized in this, that said material is subjected to the action of a sodium chloride solution under steam pressure for a period of time sufficient to render said substance soluble in water, and that a substantial portion of said substance is removed by washing the material.

9. A method of producing from Hevea latex an unvulcanized rubber material which has stable insulating properties when subjected to the continuous influence of water, which comprises heat treating said latex in the presence of a sodium chloride solution at a temperature of more than 100° C., thereby coagulating the latex without the use of other coagulants, and washing and drying the rubber material.

10. A method of treating rubber containing a naturally occurring nitrogenous substance, which involves a heat treatment, whereby a crude rubber product is obtained with a nitrogen content less than that of another crude rubber product obtained from the same kind of rubber by the same method from which the heat treatment has been omitted, said method comprising the step of subjecting the rubber to the action of a sodium chloride solution at a temperature of at least 100° C. to render said substance soluble in water, and the step of segregating the crude rubber from the serum of said rubber, said steps being performed in any order, and followed by the step of washing the crude rubber with water to remove a considerable portion of said substance rendered soluble and the step of drying the washed crude rubber.

11. A method of producing a rubber material which has stable electrical properties when submerged under sea bottom conditions, comprising the steps of solidifying and heat treating rubber in the presence of a salt solution, said rubber containing a solid, natural, nitrogenous substance, followed by a process of washing and drying the material, said step of heat treating serving to render the nitrogenous substance soluble in water by subjecting the rubber in the solution to a temperature of more than 100° C. and said washing serving to remove a considerable portion of said substance rendered soluble and contained in the solidified material.

12. A method of producing a rubber material from latex containing a natural, nitrogenous substance which comprises diluting the latex with a saline solution, then subjecting the latex to heat to decompose the nitrogenous substance and to cause the latex to form a coagulum, then washing the coagulum to reduce the amount of the decomposed substance to less than the amount of nitrogenous substance which would become included in crude rubber obtained from the latex by normal coagulation.

13. A method of producing a rubber insulating material which comprises diluting rubber latex with four parts of a sodium chloride solution to one part of latex, heating to a temperature of approximately 150° C. for about nine hours, thereby coagulating the latex, then washing the coagulum in hot water and then drying in the air.

In witness whereof, I hereunto subscribe my name this 26th day of November, A. D. 1928.

FRANK SIGFRID MALM.